US012688943B2

(12) United States Patent
Jiang et al.

(10) Patent No.: US 12,688,943 B2
(45) Date of Patent: Jul. 21, 2026

(54) SOLID LITHIUM-LEAD BLANKET FOR FUSION REACTOR

(71) Applicant: Hefei Institute of Physical Science, Chinese Academy of Sciences, Hefei (CN)

(72) Inventors: Kecheng Jiang, Hefei (CN); Songlin Liu, Hefei (CN); Lei Chen, Hefei (CN); Xuebin Ma, Hefei (CN); Qingjun Zhu, Hefei (CN); Xiaoman Cheng, Hefei (CN)

(73) Assignee: Hefei Institute of Physical Science, Chinese Academy of Sciences, Hefei (CN)

( * ) Notice: Subject to any disclaimer, the term of this patent is extended or adjusted under 35 U.S.C. 154(b) by 395 days.

(21) Appl. No.: 18/225,681

(22) Filed: Jul. 24, 2023

(65) Prior Publication Data

US 2024/0312644 A1 Sep. 19, 2024

(30) Foreign Application Priority Data

Jul. 22, 2022 (CN) ......................... 202210873241.1

(51) Int. Cl.
*G21B 1/13* (2006.01)

(52) U.S. Cl.
CPC ..................................... *G21B 1/13* (2013.01)

(58) Field of Classification Search
CPC ....................................................... G21B 1/13
See application file for complete search history.

(56) References Cited

U.S. PATENT DOCUMENTS 4,430,291 A * 2/1984 Chi .......................... G21B 1/13
976/DIG. 1

FOREIGN PATENT DOCUMENTS

| | | | | |
|---|---|---|---|---|
| CN | 104409107 A | * | 3/2015 | G21B 1/11 |
| GB | 2621178 A | * | 2/2024 | G21B 1/115 |
| JP | 05288874 A | * | 11/1993 | G21B 1/13 |

OTHER PUBLICATIONS

Pozio, A., et al. “Behaviour of hydrogenated leadâlithium alloy.” International Journal of Hydrogen Energy 42.2 (2017): 1053-1062. (Year: 2017).*

Khairulin R. A. et al., Volumetric Properties of Lithium-Lead Melts, Int. J. Thermophys. 2017, vol. 38, No. 23.

* cited by examiner

*Primary Examiner* — Sharon M Davis

(57) ABSTRACT

Disclosed is a solid lithium-lead blanket for a fusion reactor, where a solid lithium-lead alloy is adopted as a neutron multiplier and a tritium breeder, and is placed in a form of a unitary or binary pebble bed inside a structural skeleton composed of structural materials; and nuclear thermal deposition in the solid lithium-lead alloy generated due to an interaction between the solid lithium-lead alloy and a fusion neutron is moved out by a coolant. A proportion of lead atoms in the solid lithium-lead alloy is low, so that, under normal operations and accident conditions of the blanket, the solid lithium-lead alloy always remains in a solid state without melting, and tritium can be brought out of the reactor by purge gas flowing through the pebble bed to allow tritium self-sufficiency. The blanket of the present disclosure does not require beryllium to meet the requirements of tritium breeding.

4 Claims, 4 Drawing Sheets

SOLID LITHIUM-LEAD BLANKET FOR FUSION REACTOR

CROSS-REFERENCE TO RELATED APPLICATION

The present application claims priority from Chinese Patent Application No. 202210873241.1 filed on Jul. 22, 2022, the contents of which are incorporated herein by reference in their entirety.

TECHNICAL FIELD

The present disclosure belongs to the field of blankets for fusion reactors, and specifically relates to a solid lithium-lead blanket for a fusion reactor.

BACKGROUND

A blanket is a core component of a fusion reactor, and operates in a harsh service environment with a high temperature, a high pressure, a high heat load, and a strong neutron irradiation. Main functions of a blanket include: breeding tritium to maintain a fusion reaction, converting fusion energy into heat energy for power generation, and shielding neutrons to prevent environmental pollution. According to states of functional materials (neutron multipliers and tritium breeders), blankets can be divided into liquid breeder blankets and solid breeder blankets. In most of the liquid breeder blankets, a flowing lithium-lead alloy is used as a neutron multiplier and a tritium breeder, and the liquid breeder blanket has many advantages such as simple structure, allowed on-line tritium extraction, and high power generation efficiency, but has an obvious magneto-hydraulic-dynamic (MHD) effect, where the cutting of a magnetic field by a conductive fluid in the magnetic field will significantly increase a voltage drop, thereby reducing the power generation efficiency. In addition, a high-temperature lithium-lead alloy is corrosive to structural materials and can hardly operate for a long time. Therefore, some fusion institutions inside and outside China take solid breeder blankets as a main research direction, such as the Karlsruhe Institute of Technology (KIT) in Germany, the Institute for Quantum Science and Technology (QST) in Japan, the Southwestern Institute of Physics (SWIP) in China, and the Institute of Plasma Physics, Chinese Academy of Sciences (ASIPP). In most of the solid breeder blankets, a lithium-containing ceramic material is used as a tritium breeder (such as $Li_4SiO_4$ or $Li_2TiO_3$), and a beryllium-containing alloy is used as a neutron multiplier (such as elementary Be or $Be_{12}Ti$), which has advantages such as excellent structural and material compatibility, no MHD effect, and mature power generation technology.

However, the current development of the solid breeder blankets encounters the following bottleneck: because beryllium is used as a neutron multiplier and there are limited beryllium resources in the nature, the solid breeder blankets are expensive and have no competitive advantage in terms of economy. Thus, fusion institutions outside China have begun to study how to reduce the consumption of beryllium or develop a new neutron multiplier that can be used in a solid breeder blanket. The University of Sheffield (TUoS) in the United Kingdom provides the following solution for a solid tritium breeder blanket with a neutron multiplier and a tritium breeder thoroughly mixed: a volume proportion of the neutron multiplier is linearly increased or decreased in a radial direction of the blanket to adapt to changes of neutronics characteristics in the radial direction of the blanket, including neutron flux, energy, and reaction cross-section between neutrons and materials, which does not affect the tritium-producing performance of the blanket. However, this solution only makes an amount of beryllium reduced by 10%, which is difficult to meet the economic requirements of the blanket for a fusion reactor. In terms of new materials, current studies have shown that elements capable of being used to multiply neutrons in the fusion field include beryllium and lead, but elementary lead has a low melting point and easily melts to a liquid state when undergoing nuclear thermal deposition of high-energy neutrons in a solid breeder blanket. Liquid lead will penetrate into a coolant flow channel through gaps among structural components to block the coolant flow channel and hinder the flow of a coolant, so that a cooling capacity is lost, and a local material temperature and a driving power load are out of limits, which seriously affects the thermal safety performance and thermoelectric conversion efficiency of a blanket for a fusion reactor. Thus, this design has high requirements for the leak tightness of structural components, which will increase a manufacturing cost of an industrial device and reduce the economy of a fusion reactor. The Karlsruhe Institute of Technology (KIT) in Germany combines a lanthanide element and lead in a compound to increase a melting point of a neutron multiplier. A lanthanide element has a lower price than beryllium, but lanthanide elements are rare-earth elements (REEs), and there are still limited lanthanide resources. Due to the large material consumption in future fusion reactors, the use of the combination of a lanthanide element and lead as a neutron multiplier still has a high cost. In addition, the introduction of a lanthanide element in a neutron multiplier will increase an absorption capacity for neutrons, thereby reducing the tritium-producing performance of a blanket. Therefore, in order to meet neutronics requirements, it is necessary to increase an amount of a neutron multiplier material, which will increase a volume of a blanket, thereby further increasing a construction cost and reducing the economy of a fusion reactor.

SUMMARY

In order to solve the above technical problems, the present disclosure provides a solid lithium-lead blanket for a fusion reactor, which is a solid lithium-lead tritium-producing blanket for a fusion reactor and adopts solid lithium-lead as a neutron multiplier and a tritium breeder. The solid lithium-lead blanket for a fusion reactor has a low price, and can meet the tritium-producing requirements of a fusion reactor, such as to solve the problem that the use of beryllium as a neutron multiplier in the existing solid breeder blanket leads to a high cost and low economy. The solid lithium-lead blanket for a fusion reactor is expected to serve as a mainstream solid breeder blanket and contribute to the future blanket concept and engineering design for fusion reactors.

To achieve the above objective, the present disclosure adopts the following technical solutions:

A solid lithium-lead blanket for a fusion reactor is provided, including: a solid lithium-lead alloy, a coolant, and a structural material, where the solid lithium-lead alloy with a high melting point serves as a neutron multiplier and a tritium breeder; under normal operations and accident conditions of the blanket, the solid lithium-lead alloy always remains in a solid state without melting (at a temperature lower than 650° C.), and is placed in a structural skeleton composed of a plurality of the structural materials; and nuclear thermal deposition in the solid lithium-lead alloy generated due to an interaction between the solid lithium-lead alloy and a fusion neutron is moved out by the coolant flowing inside the structural skeleton for power generation, and tritium is brought out of the reactor by purge gas flowing through a pebble bed to allow tritium self-sufficiency.

Further, an optimal lithium/lead atomic ratio of the solid lithium-lead alloy is determined through neutron physics and thermal hydraulics coupling iteration.

Further, the solid lithium-lead alloy exists in a form of a pebble bed, and a binary pebble bed of different sizes or a pebble bed of a single size is adopted.

Further, according to operating conditions of the fusion reactor, water, helium, or supercritical carbon dioxide is adopted as the coolant to produce a water-cooled solid lithium-lead blanket, a helium-cooled solid lithium-lead blanket, or a supercritical carbon dioxide-cooled solid lithium-lead blanket.

Further, the operating conditions of the fusion reactor include a plasma heat flow facing a first wall, a driving power of a fan, and a reaction rate between the coolant and the solid lithium-lead alloy.

Further, according to different heat-carrying capacities of the coolant, Reduced Activation Ferritic (RAM) steel or Oxide Dispersion Strengthened (ODS) ferritic steel with different upper temperature limits is correspondingly adopted as the structural material.

Further, the plurality of the structural materials are spaced, and the solid lithium-lead alloy is filled in gaps among the plurality of the structural materials.

Further, the solid lithium-lead blanket for a fusion reactor further includes a tungsten armor, where the tungsten armor covers the structural materials in a front zone of the blanket to avoid plasma sputtering and corrosion.

The present disclosure provides a novel solid breeder blanket for a fusion reactor, where a lithium-lead alloy is used as both a neutron multiplier and a tritium breeder; and an optimal lithium/lead atomic ratio of the lithium-lead alloy is acquired through neutron physics and thermal hydraulics iterative optimization. With this lithium/lead atomic ratio, the lithium-lead alloy has a high melting point, is always in a solid state under a dual action of nuclear thermal deposition of fusion neutrons and cooling of structural components, and can meet the requirements of multi-physical fields such as neutronics, thermal hydraulics, and structural mechanics. In addition, lithium and lead resources in the nature are abundant and cheap, which can reduce a research and development cost of the blanket and improve the economy of the fusion reactor.

Compared with the existing solid breeder blankets for fusion reactors, the present disclosure has the following beneficial effects:

1. The existing solid breeder blankets for fusion reactors mostly adopt beryllium as a neutron multiplier, and because beryllium resources in the nature are limited and expensive, the existing solid breeder blankets have an extremely-high research and development cost, and are difficult to allow large-scale commercial application of fusion energy. In the present disclosure, a lithium-lead alloy is used as a neutron multiplier and a tritium breeder, which is always in a solid state under normal operations and accident operating conditions of the blanket. The blanket of the present disclosure does not require beryllium to meet the requirements of tritium breeding, and lithium and lead resources in the nature are abundant and cheap, which can reduce a research and development cost of the blanket and improve the economy of power generation of a fusion reactor with the solid breeder blanket.
2. The present disclosure adopts a single material of a lithium-lead alloy as both a neutron multiplier and a tritium breeder, rather than two materials as a neutron multiplier and a tritium breeder, respectively, which can reduce the process flows and the cost of material manufacturing. In addition, the structural arrangement and cooling system design of the single material in the blanket are relatively simple, so that an optimal design of the blanket can be quickly and accurately acquired at an initial stage of a conceptual design of the blanket, and the working efficiency can be improved; and a pressure drop of the coolant can be reduced, and the thermoelectric conversion efficiency can be improved.

In the FIGURES: 1: unitary or binary pebble bed; 2: solid lithium-lead alloy; 3: neutron multiplier and tritium breeder; 4: purge gas; 5: cooling working medium; 6: coolant; 7: Reduced Activation Ferritic (RAM) steel or Oxide Dispersion Strengthened (ODS) ferritic steel; 8: structural material; 9: tungsten armor; and 10: solid lithium-lead blanket for a fusion reactor.

DETAILED DESCRIPTION

In order to make the objectives, technical solutions, and advantages of the present disclosure more clear, the present disclosure is further described in detail below with reference to the accompanying drawings and examples. It should be understood that the specific embodiments described herein are intended merely to explain the present disclosure, rather than to limit the present disclosure. Further, the technical features involved in the various embodiments of the present disclosure described below may be combined with each other as long as they do not constitute a conflict with each other.

Figure 1:
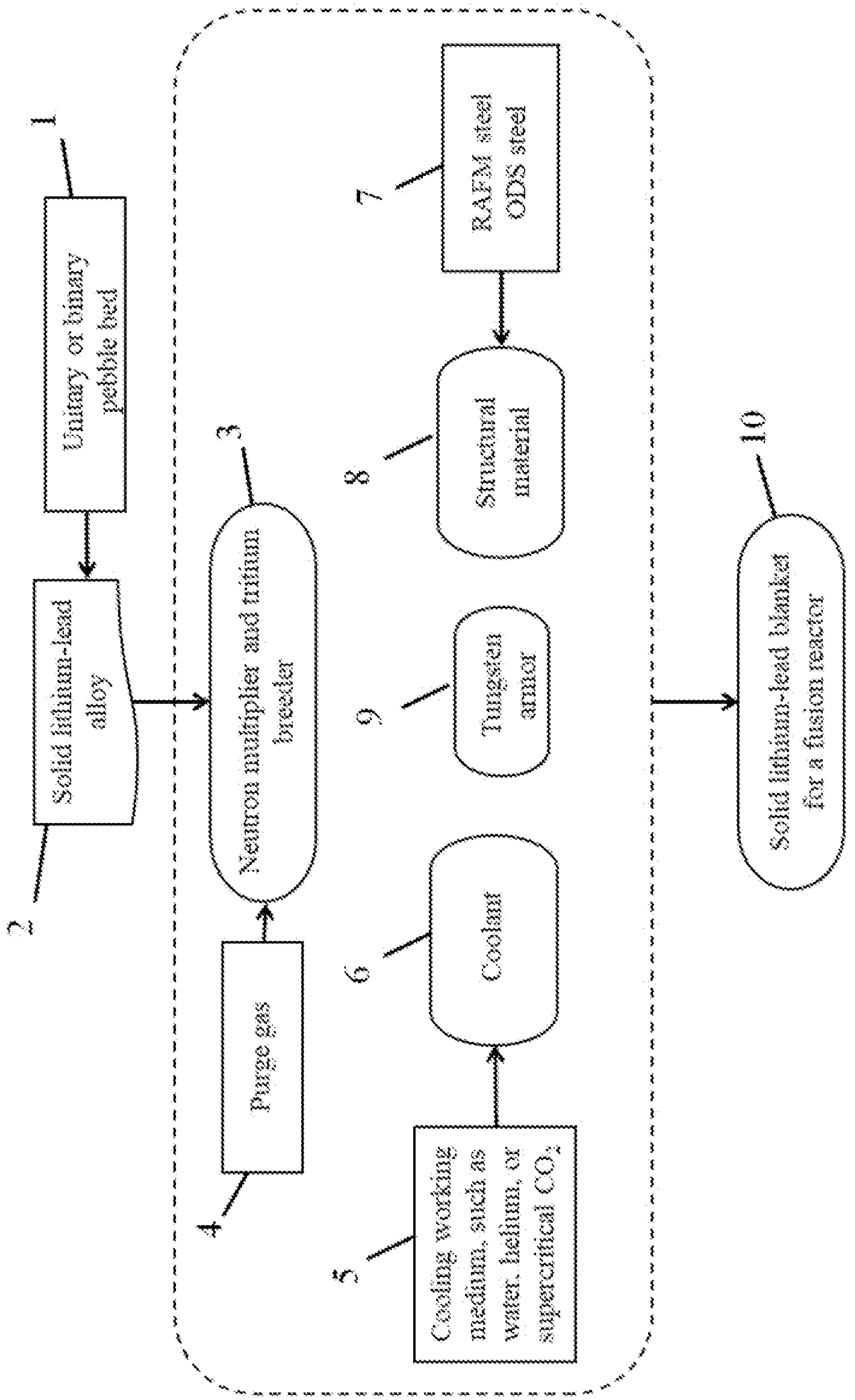
FIG. 1 shows a conceptual design of the solid lithium-lead blanket for a fusion reactor in the present disclosure.

As shown in FIG. 1, the solid lithium-lead blanket 10 for a fusion reactor of the present disclosure includes a solid lithium-lead alloy 2, a coolant 6, a structural material 8, and a tungsten armor 9. According to operating conditions of the fusion reactor, such as a plasma heat flow facing a first wall, a driving power of a fan, and a reaction rate between the coolant and the solid lithium-lead alloy, a cooling working medium 5 such as water, helium, or supercritical $CO_2$ is adopted as the coolant 6 to produce a water-cooled solid lithium-lead blanket, a helium-cooled solid lithium-lead blanket, or a supercritical carbon dioxide-cooled solid lithium-lead blanket. According to different heat-carrying capacities of the coolant 6, RAM steel or ODS ferritic steel 7 with different upper temperature limits is correspondingly adopted as the structural material 8. The tungsten armor 9 is arranged on a surface of the structural material 8 in a front zone of the blanket to avoid plasma sputtering and corrosion.

The solid lithium-lead blanket 10 for a fusion reactor adopts a solid lithium-lead alloy 2 as a neutron multiplier and a tritium breeder 3. Under normal operations and accident conditions of the blanket, the solid lithium-lead alloy 2 always remains in a solid state without melting, and is placed in a structural skeleton composed of a plurality of the structural materials 8. Nuclear thermal deposition in the solid lithium-lead alloy generated due to an interaction between the solid lithium-lead alloy and a fusion neutron is moved out by the coolant 6 inside the structural skeleton for power generation.

The solid lithium-lead alloy 2 exists in a form of a pebble bed, and a unitary or binary pebble bed 1 may be adopted; and tritium is brought out for recycling by purge gas 4 flowing through the pebble bed. The binary pebble bed design can improve a filling rate, thereby increasing a tritium breeding rate; and the unitary pebble bed design can reduce a pressure drop of a purged gas, thereby improving the economy.

Figure 2:
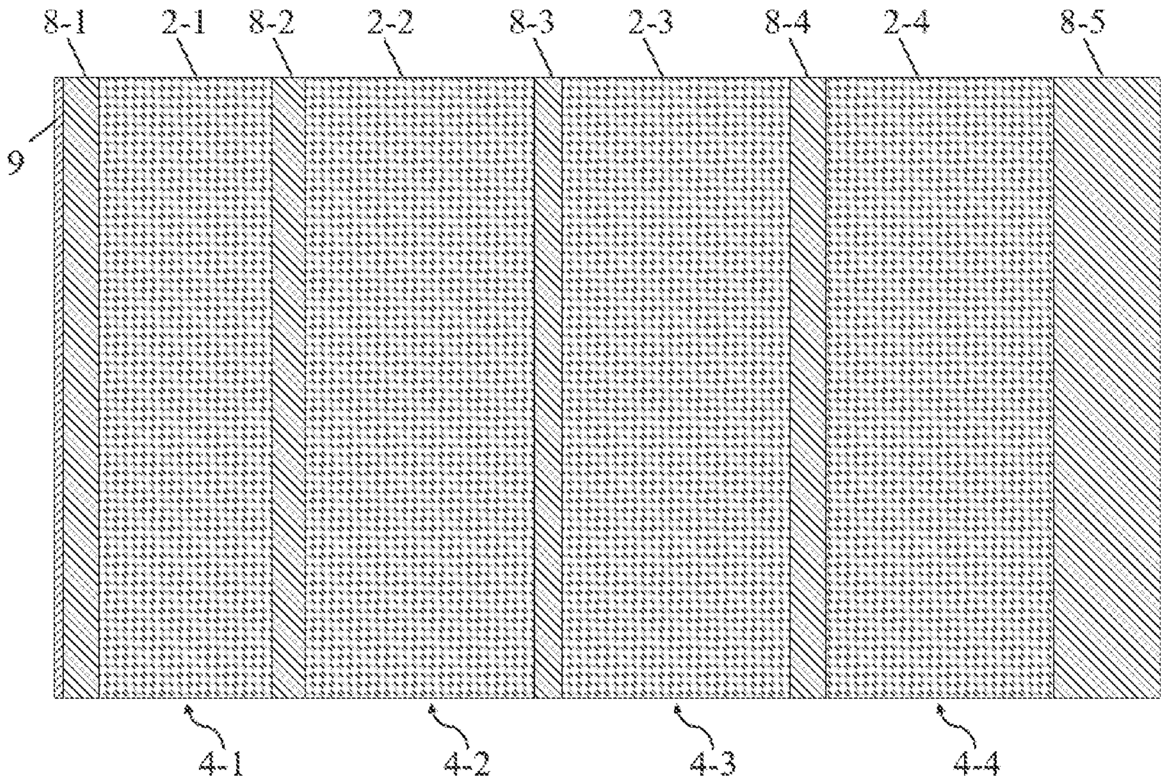
FIG. 2 shows a structural arrangement of the solid lithium-lead blanket for a fusion reactor in the present disclosure.

As shown in FIG. 2, under normal operations and accident conditions of the blanket, a first solid lithium-lead alloy 2-1, a second solid lithium-lead alloy 2-2, a third solid lithium-lead alloy 2-3, and a fourth solid lithium-lead alloy 2-4 always remain in a solid state without melting, and are placed in a structural skeleton composed of a first structural material 8-1, a second structural material 8-2, a third structural material 8-3, a fourth structural material 8-4, and a fifth structural material 8-5 that are spaced. Each solid lithium-lead alloy is arranged between two adjacent structural materials. The tungsten armor 9 covers the first structural material 8-1 in a front zone of the blanket to avoid plasma sputtering and corrosion. The nuclear thermal deposition in the solid lithium-lead alloy generated due to an interaction between a lithium-lead alloy and a fusion neutron is moved out by the coolant 6 flowing inside the first structural material 8-1, the second structural material 8-2, the third structural material 8-3, the fourth structural material 8-4, and the fifth structural material 8-5 for power generation; and tritium is brought out of the reactor by first purge gas 4-1 flowing through a pebble bed, second purge gas 4-2 flows through a pebble bed, third purge gas 4-3 flowing through a pebble bed, and fourth purge gas 4-4 flowing through a pebble bed to allow cyclic tritium self-sufficiency.

Figure 3:
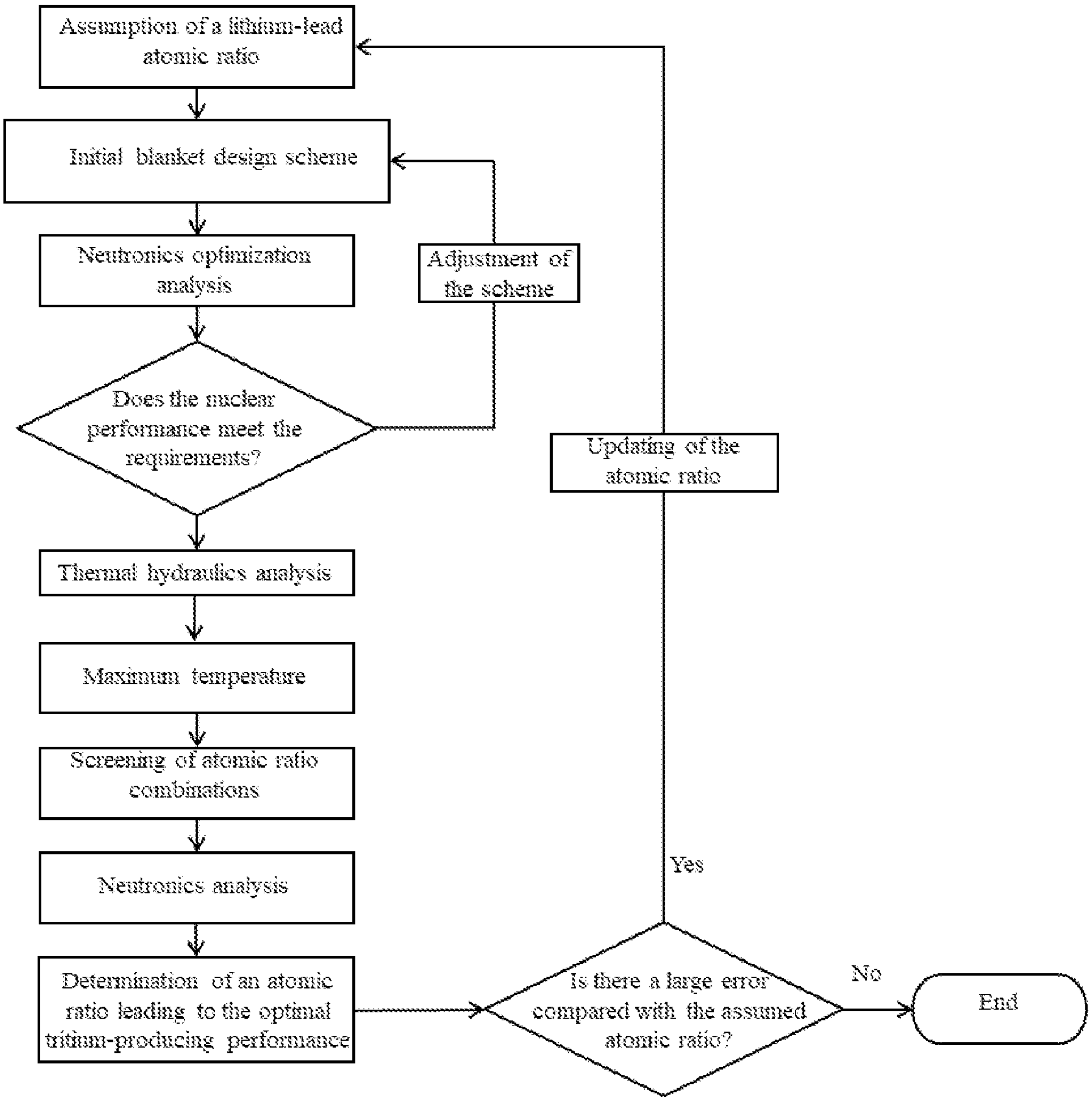
FIG. 3 shows an optimization design of the solid lithium-lead blanket for a fusion reactor in the present disclosure.

As shown in FIG. 3, the solid lithium-lead alloy used in the solid lithium-lead blanket for a fusion reactor of the present disclosure has a high melting point, and exhibits different characteristics under different lithium/lead atomic ratios. An optimal lithium/lead atomic ratio is determined by the following process:

Based on operating conditions of a blanket design and thermophysical parameters of a coolant and a breeder material (a tritium breeder and a neutron multiplier), a lithium/lead atomic ratio is assumed, and an initial blanket design scheme is formulated.

Further, neutronics iterative optimization analysis is conducted, and a nuclear thermal deposition distribution of a blanket is acquired by adjusting the blanket scheme to make the nuclear performance meet requirements, and is used as a source term of thermal hydraulics analysis.

Further, thermal hydraulics analysis is conducted to obtain a maximum temperature of the lithium-lead alloy in different breeding zones of the blanket.

Figure 4:
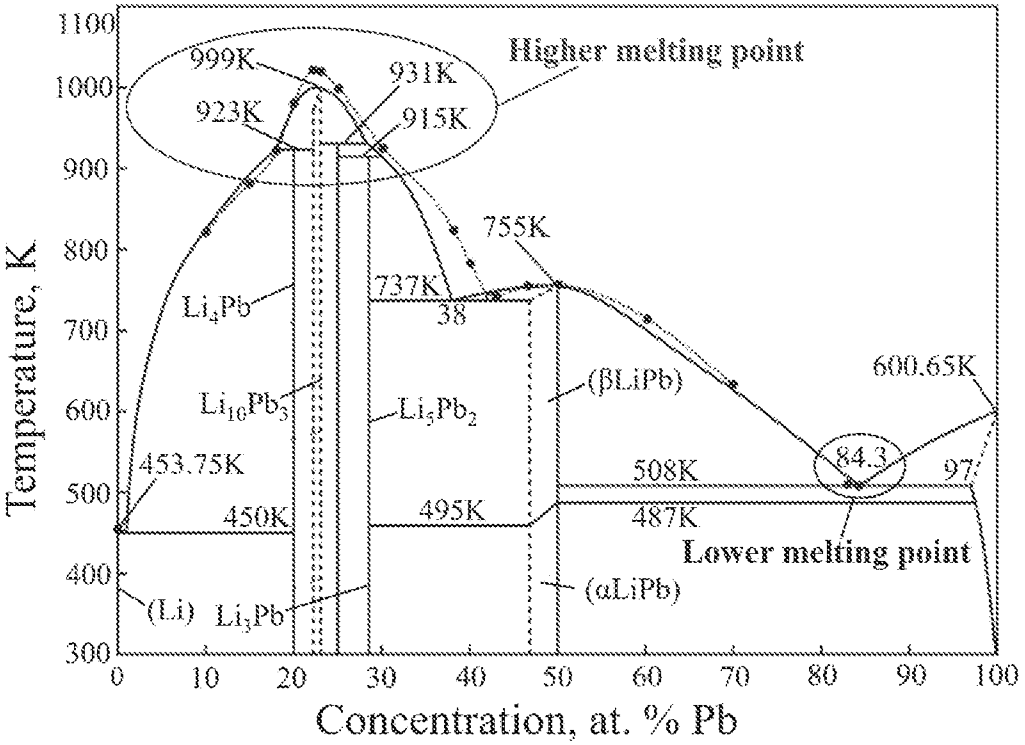
FIG. 4 (Prior Art)
FIG. 4 is a binary eutectic phase diagram of a lithium-lead alloy.

Further, based on the binary eutectic phase diagram of a lithium-lead alloy (Volumetric properties of lithium-lead melts; Khairulin R. A., Abdullaev R. N. and Stankus S. V. Int. J. Thermophys. 38, 23. (2017)) as shown in FIG. 4, atomic ratio combinations each with a melting point higher than the maximum temperature are screened out to obtain a required lithium/lead atomic ratio range.

Further, neutronics analysis is conducted in the lithium/lead atomic ratio range to determine whether the tritium-producing requirements are met, and a solid lithium-lead alloy with a lithium/lead atomic ratio leading to the optimal tritium-producing performance is selected as a neutron multiplier and a tritium breeder.

Finally, if the new atomic ratio has a large error compared with the assumed atomic ratio, the atomic ratio is updated, and the iterative calculation is restarted until convergence.

Those not described in detail in the present disclosure are well-known technologies in the prior art. Although the descriptive specific embodiments of the present disclosure are described above to facilitate those skilled in the art to understand the present disclosure, it should be known that the present disclosure is not limited to the scope of the specific embodiments. Various obvious changes made by those of ordinary skill in the art within the appended claims and the spirit and scope of the present disclosure should fall within the protection scope of the present disclosure.

The invention claimed is:

1. A solid lithium-lead blanket for a fusion reactor, comprising: a solid lithium-lead alloy having a melting point of at least 650° C., a coolant, and a structural skeleton comprising a plurality of spaced structures made of a structural material, wherein the solid lithium-lead alloy is filled in gaps between adjacent ones of the plurality of spaced structures, and serves as a neutron multiplier and a tritium breeder; under normal operations and accident conditions of the blanket, the solid lithium-lead alloy always remains in a solid state without melting;

the solid lithium-lead alloy exists in a form of pebble bed; and the pebble bed is a binary pebble bed containing pebbles with two different sizes, or a unitary pebble bed containing pebbles with a uniform size; and the structural skeleton comprises a coolant channel disposed therein, and a gas access port; the coolant channel is configured to allow the coolant to flow therein for removal of nuclear thermal deposition; and the gas access port is configured to allow purge gas to flow through the pebble bed for extraction of tritium.

2. The solid lithium-lead blanket for a fusion reactor according to claim 1, wherein the coolant is selected from water, helium, or supercritical carbon dioxide.

3. The solid lithium-lead blanket for a fusion reactor according to claim 1, wherein the structural material is selected from Reduced Activation Ferritic (RAM) steel or Oxide Dispersion Strengthened (ODS) ferritic steel.

4. The solid lithium-lead blanket for a fusion reactor according to claim 1, further comprising a tungsten armor covering the structural material in a front zone of the blanket to avoid plasma sputtering and corrosion.

* * * * *